Oct. 18, 1966   A. FISCHER   3,279,014
CABLE CLAMP
Filed Oct. 16, 1964
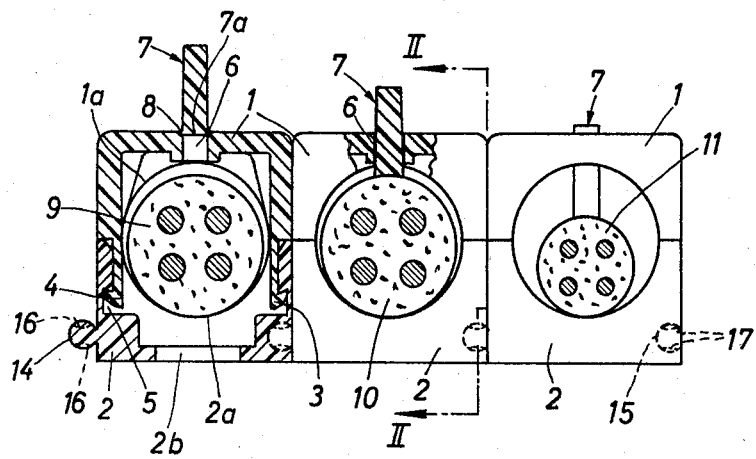
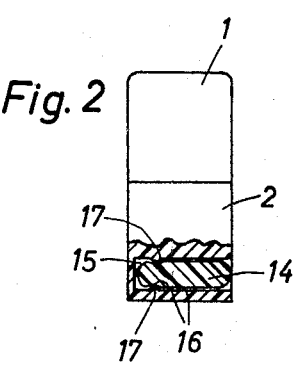
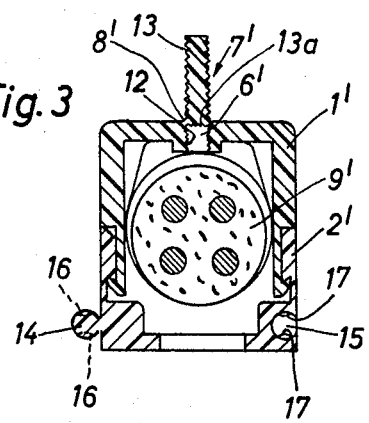
INVENTOR.
ARTUR FISCHER
BY Michael J. Striker 3,279,014
CABLE CLAMP
Artur Fischer, Kreis Freudenstadt, Germany
Filed Oct. 16, 1964, Ser. No. 404,375
Claims priority, application Germany, Oct. 29, 1963,
F 41,135
3 Claims. (Cl. 24—115)

The present invention relates to fixtures which may be used to guide and/or to locate and arrest cables, pipes, hoses, rods, bars and similar elongated bodies of circular, oval or polygonal outline. More particularly, the invention relates to a clamp or hanger for cables or the like which constitutes an improvement over and a further development of clamps or hangers disclosed in my United States Patent No. 3,188,030 issued June 8, 1965.

It is an important object of the present invention to provide a very simple, lightweight, inexpensive but very reliable and eye-pleasing clamp for cables or the like and to construct the clamp in such a way that the cable is retained with a force which exceeds the bias of a leaf spring or a similar resilient element.

Another object of the invention is to provide a clamp or hanger of the just outlined characteristics which is constructed, configurated and assembled in such a way that it may accommodate, retain and lock cables of different diameters.

A further object of the invention is to provide a clamp or hanger for cables and the like which may be assembled with one or more similar clamps to form a bank of properly aligned fixtures for cables of identical or different diameters.

An additional object of my invention is to provide a clamp or hanger which is capable of resisting the corrosive influences of air, moisture, dust and/or any other substances with which a clamp comes in contact when it is used to locate a cable or the like.

A concomitant object of the instant invention is to provide a clamp or hanger which need not be provided with internally or externally threaded parts and wherein the cable may be retained with a greater or lesser force, depending on the purpose of the cable and on the material of which the cable consists.

Still another object of the invention is to provide a clamp or hanger which is constructed in such a way that the fastener which secures it to a rail or to another supporting structure is fully concealed from view when the clamp or hanger accommodates a cable.

With the above objects in view, one feature of my invention resides in the provision of a fixture, particularly a clamp for cables or the like, which comprises a housing preferably consisting of tough, corrosion-resistant synthetic plastic material and defining a cable-receiving through opening, a through bore or hole provided in the housing in communication with the opening and extending substantially radially with reference thereto, a pin having an inner end portion adjacent to the outer end of the bore, and a readily destructible or removable connection securing the inner end portion of the pin to the housing so that, on destruction or removal of the connection, the pin may be driven through the bore until its inner end portion engages the cable in the opening and presses it against the adjacent portion of the housing. The diameter of the pin is selected in such a way that its peripheral surface engages the housing with substantial friction, and such friction may be increased by providing the pin and/or the housing with suitable projections in the form of teeth, ribs or the like.

In accordance with a preferred embodiment of my invention, the connection between the pin and the housing consists of a thin diaphragm-like web which is integral with the pin and with the housing but may be destroyed by a blow against the outer end portion of the pin. The web may maintain the pin in registry with the through bore of the housing.

The novel features which are considered as characteristic of the invention are set forth in particular in the appended claims. The improved fixture itself, however, both as to its construction and its mode of operation, together with additional features and advantages thereof, will be best understood upon perusal of the following detailed description of certain specific embodiments with reference to the accompanying drawings, in which:

FIG. 1 is a front elevational view of a bank of aligned clamps or hangers each of which supports and guides a differently dimensioned cable, two of the clamps being shown in partial section;

FIG. 2 is a transverse vertical section as seen in the direction of arrows from the line II—II of FIG. 1; and FIG. 3 is a section through a modified clamp or hanger.

Referring first to FIG. 1, there is shown a bank of fixtures in the form of cable clamps each of which comprises a two-piece housing including an upper section 1 and a lower section 2. Such sections consist of tough, corrosion-resistant synthetic plastic material, preferably a plastic capable of resisting the action of softeners which are normally present in the comparatively soft mantle or shell of an electric cable.

The sections 1, 2 are provided with cooperating male and female coupling means which enable the operator to quickly assemble or disassemble a housing. As shown, each such coupling means may include two resilient projections 3, 4 which depend from the upper section 1 and comprise heads adapted to be received in complementary recesses 5 defined by the lower section 2. The heads and the lower sections 2 are provided with inclined guide faces which facilitate the insertion of projections 3, 4. The sections 1, 2 of each housing are formed with registering cutouts 1a, 2a which together define a circular through opening adapted to accommodate a portion of an electric cable. The leftmost housing of FIG. 1 accommodates a large-diameter cable 9, the medium housing accommodates a cable 10 of somewhat smaller diameter, and the rightmost housing accommodates a cable 11 of smallest diameter. Since the cutouts 2a are similar, the lowermost points of cables 9, 10, 11 are disposed in a common plane.

The lower sections 2 of all three housings shown in FIG. 1 are detachably secured to each other by coupling means in the form of horizontal ribs 14 extending from one side of the respective lower sections. The other side of each lower section 2 is provided with a horizontally extending groove 15 which may accommodate the rib 14 of the adjoining lower section. In order to make sure that the lower sections 2 are connected against vertical and horizontal movement with reference to each other, the ribs 14 are provided with cutouts 16, best shown in FIG. 2 which may receive complementary protuberances 17 provided in the grooves 15 of the adjoining lower sections. In other words, when the rib 14 of a first lower section is driven or forced into the groove 15 of an adjoining lower section, the two lower sections are attached to each other against movement in the longitudinal direction of the rib, against angular movement about the axis of the rib, and against movement in a direction at right angles to the axis of the rib. The material of the lower sections 2 is sufficiently elastic to permit rapid insertion or removal of ribs 14 from the respective grooves 15 if the operator exerts a force which suffices to deform the proturberances 17.

In accordance with the present invention, each upper section 1 is provided with a vertical through bore 6 which extends substantially radially with reference to the corresponding cable. Each bore 6 may receive a locking pin 7 which can be driven home to such an extent that its inner end face 7a comes in abutment with the periphery of the corresponding cable. The pins 7 may consist of the same material as the sections 1 and 2, and each thereof is preferably connected with the corresponding upper section 1 by a thin web 8 of plastic material which is destroyed in a fully automatic way when the operator begins to drive the pin home. The diameter of each pin at least equals or slightly exceeds the diameter of the corresponding through bore 6 so that the pins may be retained with substantial friction which suffices to maintain the corresponding cable in abutment with the associated lower section 2. Thus, by the simple expedient of driving home a series of pins 7, the operator may properly arrest and retain a series of different cables 9, 10, 11 in such positions that the lowermost points of all cables are located in a common plane. In FIG. 1, the cables 10, 11, are kept in abutment with the corresponding lower sections but the leftmost pin 7 is still to be driven home, i.e., the leftmost web 8 is still intact. The operator may resort to a hammer or to another suitable tool. If the cables are to be permanently retained in the positions shown in FIG. 1, the operator may resort to a knife and severs such portions of the pins 7 which extend from the upper sections 1. As a rule, the friction between the smooth peripheral surface of a tightly fitted pin 7 and the smooth surface which surrounds the corresponding bore 6 suffices to maintain the pins in locking or retaining positions.

The apertures 2b in the bottom walls of the lower sections 2 may receive expansion anchors or other types of fasteners (not shown) which serve to attach the housing to a rail or another supporting structure. The cables 9–11 fully conceal such fasteners.

FIG. 3 illustrates a slightly modified fitting in the form of a cable clamp which comprises a housing having an upper section 1' and a lower section 2'. The two sections are coupled to each other in the same way as described in connection with FIGS. 1 and 2. However, the through bore 6' in the upper section 1' is bounded by a roughened surface which exhibits a series of ribs, teeth or similar projections 12. This bore may receive a pin 7' which may be provided with external ribs, teeth or similar projections 13 to make sure that the pin is strongly anchored in the upper section 1' when the operator decides to arrest the cable 9' in the through opening defined by the cutouts of the sections 1', 2'. To make sure that the cable 9' is held against any movements, including axial movements, with reference to the sections 1', 2', the inner end face of the pin 7' is provided with ribs, teeth or similar projections 13a which may bite into the mantle of the cable 9'. The web 8' connects the pin 7' to the upper section 1' until the operator decides to drive the pin home.

The length of the pins 7, 7' is selected in such a way that each pin may engage a cable of comparatively small diameter or a cable which nearly fills the through opening of the corresponding housing.

A very important advantage of my improved fixture is that the cables may be located and fixed within very short periods of time. Thus, it is not necessary to resort to screwdrivers since a single blow with a hammer will suffice to drive a pin home. Also, the webs 8, 8' insure that the pins remain attached to the corresponding upper sections during storage and/or transportation; furthermore, such webs keep the pins in registry with the corresponding bores 6 or 6' so that the operator need not hold the pin at the time he resorts to a hammer in order to drive the pin home.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A fixture, particularly a clamp for cables and the like, comprising a housing defining a cable-receiving through opening, said housing having a through bore communicating with said opening; a pin having an inner end portion adjacent to the outer end of said bore; and a readily destructible connection securing said inner end portion to said housing so that, on destruction of said connection, the pin may be driven into said bore until said inner end portion engages a cable in said opening and presses the cable against said housing, the diameter of said pin being such that its peripheral surface is retained in said bore by friction.

2. A fixture as set forth in claim 1, wherein said fixture and said pin consist of synthetic plastic material and said connection is a web which is integral with said housing and said pin.

3. A fixture as set forth in claim 1, wherein said connection maintains the pin in registry with said bore.

References Cited by the Examiner

UNITED STATES PATENTS

| | | | |
|---|---|---|---|
| 2,921,819 | 1/1960 | Rifkin. | |
| 2,956,468 | 10/1960 | Macy | 174—153 X |
| 2,988,386 | 6/1961 | Hempel | 287—52.09 X |
| 2,997,522 | 8/1961 | Schneider | 339—276 X |
| 3,005,182 | 10/1961 | Janik | 339—272 X |

FOREIGN PATENTS

| | | |
|---|---|---|
| 1,116,728 | 5/1956 | France. |
| 699,892 | 8/1942 | Germany. |
| 2,397 | 6/1879 | Great Britain. |

BERNARD A. GELAK, *Primary Examiner.*